United States Patent [19]
Asker

[11] 4,070,685
[45] Jan. 24, 1978

[54] FIRING SPRING COCKING MECHANISM

[75] Inventor: Graham Edward Asker, Ware, England

[73] Assignee: Eastman Kodak Company, Rochester, N.Y.

[21] Appl. No.: 780,139

[22] Filed: Mar. 22, 1977

[51] Int. Cl.² .............................................. G03B 15/03
[52] U.S. Cl. ................................................... 354/135
[58] Field of Search ............... 354/126, 129, 135, 250, 354/251, 253, 142

[56] References Cited

U.S. PATENT DOCUMENTS

| | | | |
|---|---|---|---|
| 2,972,937 | 2/1961 | Suits | 354/135 |
| 3,584,550 | 6/1971 | Malone et al. | 354/142 |
| 3,677,157 | 7/1972 | Sturm | 354/142 X |
| 3,699,860 | 10/1972 | Winkler | 354/142 |
| 3,719,126 | 3/1973 | Engelsmann et al. | 354/142 X |
| 3,958,259 | 5/1976 | Genesky | 354/135 |

*Primary Examiner*—Donald A. Griffin
*Attorney, Agent, or Firm*—D. P. Monteith

[57] ABSTRACT

A mechanism for cocking the firing spring of a piezoelectric generator in a photographic camera includes a ramp surface on a body release member that is movable into engagement with the firing spring during return movement of the body release member, to move the firing spring to a latched position. A latch is provided to maintain the firing spring in its latched position during a first portion of the operation of the body release member and to release the firing spring in synchronism with actuation of a photographic shutter.

3 Claims, 4 Drawing Figures

FIRING SPRING COCKING MECHANISM

CROSS REFERENCE TO RELATED APPLICATIONS

Reference is made to commonly assigned, co-pending U.S. patent application: Ser. No. 780,148, filed Mar. 22, 1977, in the names of Guilford E. Kindig and Chester W. Michatek, and entitled "FILM ADVANCE, PROCESSING, AND SHUTTER ACTUATION SYSTEM"; and Ser. No. 780,149, filed Mar. 22, 1977, in the name of Donald M. Harvey, and entitled: "IMPROVED PHOTOGRAPHIC APPARATUS FOR USE WITH SELF PROCESSING FILM UNITS".

BACKGROUND OF THE INVENTION

1. Field of the Invention

The present invention relates to photographic apparatus and more particularly to an improved cocking mechanism for moving a piezoelectric firing spring to a latched position in such apparatus.

2. Description of the Prior Art

The use of a piezoelectric crystal to power a flash unit in photographic apparatus is known. See U.S. Pat. Nos. 2,856,564; 2,972,937 and 3,106,080. Recently apparatus has been developed in which a plurality of flashlamps, each fireable by means of an electric pulse generated by a piezoelectric crystal, are assembled in a multilamp array. In one such array, as disclosed in more detail in U.S. Pat. No. 3,941,447, all of the lamps are aligned in the same direction and each lamp has its own reflector. A switching mechanism is provided, internal to the array, for properly sequencing firing of the individual lamps. In photographic apparatus adapted to use such an array, a piezoelectric crystal striking mechanism is provided, including a firing spring with an associated hammer, movable from a latched position to strike the piezoelectric crystal and thereby generate an electric pulse. In addition, a cocking mechanism is provided for moving the firing spring to its latched position prior to a subsequent actuation. In cameras of the type having a film advance slide in close proximity to the piezo firing spring, one method of cocking the spring is by means of a ramp associated with the film advance slide. See U.S. Pat. No. 3,958,259 wherein this simple but effective method of cocking the piezoelectric firing spring is described. However, in cameras in which the firing spring is not located in proximity to the film advance mechanism, this method of cocking the firing spring is not practical and some other method must be sought. Such a camera is described in the above-referenced, co-pending U.S. patent applications wherein the piezoelectric firing spring is cocked by means of pivotal linkage cooperating with the body release member upon return of the body release member from its actuating position. An extended portion of a high energy lever that operates an impact shutter serves as the latch for the piezoelectric hammer. The present invention is directed to an improvement in such apparatus.

SUMMARY OF THE INVENTION

Accordingly, it is an object of the present invention to improve the firing spring cocking mechanism for photographic apparatus of the type wherein the firing spring is not located in proximity to the film advance mechanism.

This and other objects of the present invention are provided by a photographic camera that includes a cocking mechanism in which a piezoelectric firing spring is mounted within the camera for movement between a latched position and a striking position. The piezoelectric firing spring is formed with a striking hammer, an intermediate section having a generally elongated straight shape, and a ramp follower portion adjacent the striking hammer. The camera further includes a body release member, a high energy lever having an extension serving as a firing spring latch, and a high energy lever latch. A ramp surface on the body release member is movable into engagement with the ramp follower portion of the piezoelectric firing spring. During return movement of the body release member, the ramp surface engages the piezoelectric firing spring and moves it to a latched position in which the piezoelectric firing spring is held by an extension of the high energy lever. Subsequent movement of the body release member, to cause shutter operation of the camera, disengages the high energy lever latch thereby allowing the high energy lever latch to actuate the shutter and to release the piezoelectric firing spring.

DESCRIPTION OF THE DRAWINGS

In the detailed description of the preferred embodiment of the invention presented below, reference is made to the accompanying drawings in which.

DESCRIPTION OF THE PREFERRED EMBODIMENT

Because photographic apparatus is well known, the present description will be directed in particular to elements forming part of, or cooperating more directly with, the present invention. Elements not specifically shown or described herein are understood to be selectable from those known in the art.

Figure 1:
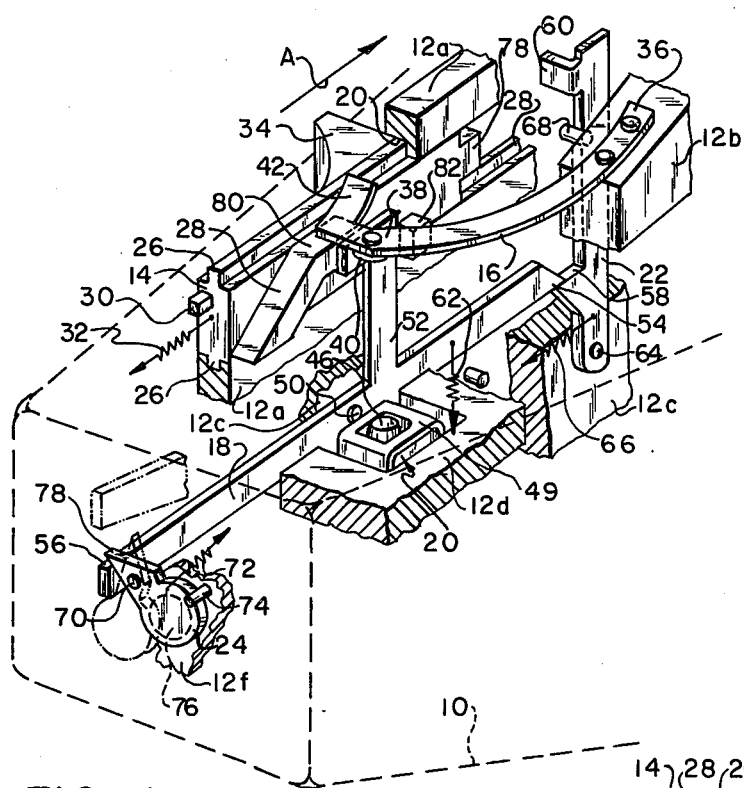
FIG. 1 is a perspective view of a firing spring cocking mechanism according to the present invention showing the piezoelectric firing spring in its latched position.

As seen in FIG. 1, the photographic apparatus includes a housing 10, outlined in phantom, and a body 12 shown as broken away portions 12a, b, c, d, e, and f on which are mounted respectively, a body release member 14, a piezoelectric firing spring 16, a high energy lever 18, a piezoelectric generator 20, a high energy lever latch 22, and a shutter 24. Body release member 14 is slidably mounted in body portion 12a by means of a pair of rails 26 on the body release member which ride in a pair of slots in the body portion 12a. Body release member 14 includes a ramp surface 28 and is biased to a rest position against a stop 30 by means of a spring 32. The camera operator can move body release member 14 from its rest position by engaging an extension 34 which is accessible externally of the apparatus. Surface 28 on body release member 14 is in the form of a plane inclined to the path of movement of the body release member.

Figure 4:
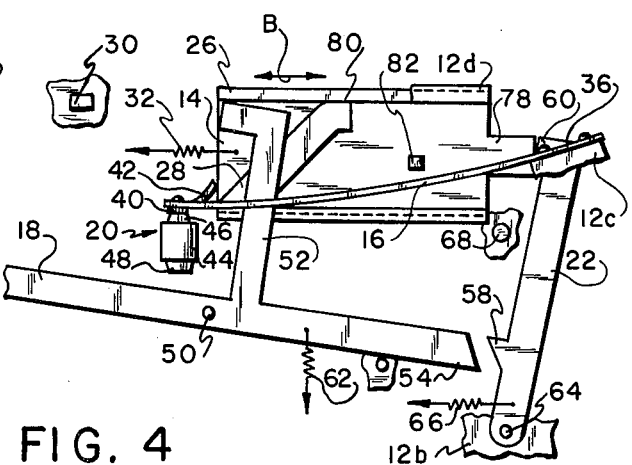
FIG. 4 is an elevation view of the firing spring cocking mechanism in its unlatched position.

Piezoelectric firing spring 16 is mounted in the form of a cantilever beam on body portion 12b. The firing spring is constructed of an elongated flat strip of spring material including a fixed end 36 and a striking end 38 on which is formed a hammer 40 and a ramp follower portion 42 adjacent the striking end 38. Fixed end 36 of the piezoelectric firing spring 16 is mounted such that hammer 40 is brought into contact with piezoelectric generator 20 when the firing spring is in its unlatched position (FIG. 4). Ramp follower portion 42 lies in the path of movement of ramp surface 28 on body release member 14.

Figure 2:
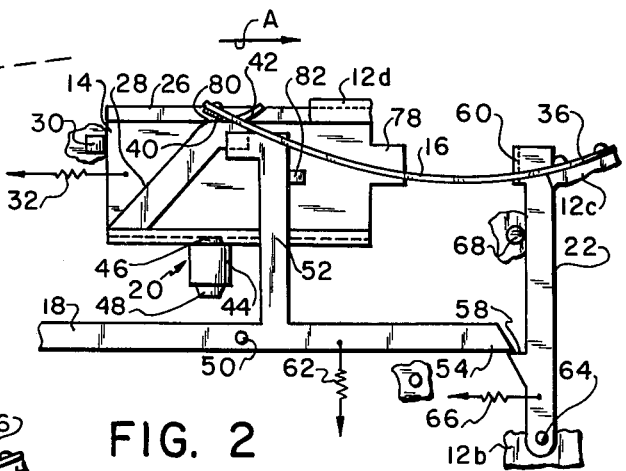
FIG. 2 is an elevation view of the firing spring cocking mechanism of FIG. 1 shown prior to movement of the body release member.

As shown in FIG. 2, the piezoelectric generator 20 includes a piezoelectric crystal 44, a first anvil 46, and a second anvil 48. First and second anvils 46 and 48 are positioned at opposite ends of piezoelectric crystal 44. The generator 20 is mounted by means of a spring clip 49 (FIG. 1), which is fixed within the body of the apparatus and engages anvil 46. While the electrical connections to piezoelectric generator 20 are not shown, it is understood that an electrical lead may be connected with each of anvils 46 and 48 and such leads may then be connected to other portions of the photographic apparatus such as a socket for use with a multilamp photoflash array as is disclosed in U.S. Pat. No. 3,941,447.

High energy lever 18 is pivotally mounted to body portion 12c on a pin 50. The high energy lever 18 includes an extension 52 that serves as a firing spring latch, a latching surface 54, and an impact surface 56. Latch 22 includes a latching surface 58 and an unlatching tab 60, is pivotally mounted by means of a pin 64 on body portion 12c, and is biased by a spring 66 into its latching position against a stop pin 68. High energy lever 18 is biased in a clockwise direction about pin 50 by means of a spring 62 so that its latching surface 54 is engaged by latching surface 58 of latch 22.

Shutter blade 24 is pivotally mounted by means of a pin 70 and is biased in a counterclockwise direction, by means of a spring 72, against a stop pin 74 in a position to cover a taking aperture 76. Shutter blade 24 includes a nose 78 which is adapted to be hit by impact surface 56 of high energy lever 18 to rotate shutter blade 24 against the bias of spring 72 to uncover the aperture to effect an exposure. The operation of the apparatus will now be described with reference to FIGS. 2, 3, and 4.

In the position shown in FIG. 2, the firing spring 16 is shown in its cocked position with ramp following portion 42 resting on a horizontal surface 80 at the top of ramp surface 28 and high energy lever 18 held in its latched position by latch 22.

As body release member 14 is moved by the operator in the direction of arrow A (FIG. 3), ramp follower portion 42 of piezoelectric firing spring 16 slides down ramp surface 28 until the striking end 38 of firing spring 16 rests on top of extension 52 of high energy lever 18. As body release member 14 continues to be moved in the direction of arrow A, ramp surface 28 is moved out of the path of ramp follower portion 42 of firing spring 16. By the time extension 78 of body release member 14 reaches unlatching tab 60 of latch 22, ramp surface 28 has moved completely out of the path of ramp follower portion 42. As body release member 42 continues to be moved in the direction of arrow A, extension 78 of body release member 14 engages unlatching tab 60 of latch 22 causing latch 22 to rotate clockwise about pin 64. During such movement, latch surface 58 of latch 22 disengages from latch surface 54 of high energy lever 18 permitting high energy lever 18 to quickly rotate in a clockwise direction under the influence of spring 62. As high energy lever 18 rotates, impact surface 56 engages nose 78 of shutter blade 24 to rotate shutter blade 24 clockwise to the position shown in phantom to thereby effect an exposure. Simultaneously, extension 52 releases the striker end 38 of firing spring 16 to allow the firing spring to move from its latched position toward its striking position in which hammer 40 strikes anvil 46. In the position shown in FIG. 4, the firing spring is in its striking position in which hammer 40 has struck first anvil 46, thereby generating an electric pulse by means of piezoelectric generator 20 to ignite a flashlamp. In this way, the opening of shutter 24 and the firing of flashlamps have been synchronized.

In order to return piezoelectric firing spring 16 to its latched position, the operator allows body release member 14 to return to its rest position in the direction of arrow B in FIG. 4 under the influence of spring 32. As body release member 14 returns to its rest position, ramp surface 28 encounters ramp follower portion 42 of firing spring 16, thereby moving the firing spring 16 away from its striking position. When body release member 14 approaches its rest position against stop 30, ramp follower portion 42 of the piezoelectric firing spring 16 rests on horizontal surface 80 at the top of ramp surface 28. As body release member 14 continues its movement toward stop 30, an extension 82 on body release member 14 engages extension 52 of high energy lever 18 to rotate high energy lever 18 in a counterclockwise direction against the force of spring 62 thereby cocking shutter 24 and latching high energy lever 18 on latch 22. In this position (shown in FIG. 2), firing spring 16 is in its cocked position and extension 52 of high energy lever 18 is disposed in the path of striker end 38 of firing spring 16.

Figure 3:
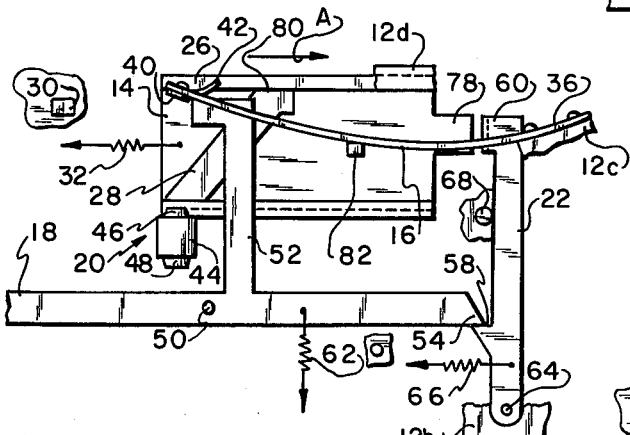
FIG. 3 is an elevation view of the firing spring cocking mechanism showing the body release member partially moved toward its releasing position and showing the piezoelectric firing spring in its latched position.

To provide a subsequent exposure and synchronized generation of electrical energy by piezoelectric generator 20, body release member 14 is again moved in the direction of arrow A (FIG. 3).

The invention has been described in detail with particular reference to a preferred embodiment thereof, but it will be understood that variations and modifications can be effected within the spirit and scope of the invention.

I claim:

1. Photographic apparatus, comprising: means, including a piezoelectric crystal and a firing spring movable from a cocked position to a striking position, for generating electrical energy;

a shutter;

a shutter actuating member movable from a latched position to an unlatched position to actuate the shutter for effecting an exposure and to release the firing spring from its cocked position to allow it to move to its striking position;

a latch for releasably retaining the shutter actuating member in its latched position; and a body release member movable between a rest position and an operating position wherein the body release member is adapted to release said latch, the body release member including means for returning the shutter actuating member to its latched position upon movement of the body release member from its operating position to its rest position, said body release member having a surface, said surface being adapted to engage the firing spring upon movement of the body release member from its operating position to its rest position, to move the firing spring from its striking position to its cocked position.

2. In a photographic camera, the combination comprising:
   a. a body release member moveable from a first position to a second position;
   b. a firing spring including a ramp follower portion, said firing spring being moveable between a first position and a second position;
   c. a latch engageable with said firing spring and adapted to releasably retain said firing spring in said first position and adapted to release said firing spring in response to movement of said body release member from said first position to said second position; and
   d. a ramp carried by said body release member and engageable with said ramp follower portion of said firing spring to move said firing spring from its second position to its first position in response to movement of said body release means from its second position to its first position.

3. In a photographic camera, the combination comprising:
   a. means for generating electrical energy, including a piezoelectric crystal and a firing spring moveable from a cocked position wherein energy is stored in said spring to a firing position wherein said spring is adapted to deliver said stored energy to said crystal;
   b. a shutter;
   c. an actuating member movable between a latched position wherein said actuating member is adapted to releasably hold said firing spring in said cocked position and an unlatched position wherein said actuating member is adapted to actuate said shutter to effect an exposure;
   d. a latch adapted to releasably retain said actuating member in its latched position;
   e. a body release member slidable between a rest position and an actuating position werein said body release member is adapted to effect the release of said latch, said body release member including a ramp surface adapted to engage said firing spring to move said firing spring from its firing position to its cocked position in response to movement of said body release member from its actuating position to its rest position.

* * * * *